Patented May 13, 1941

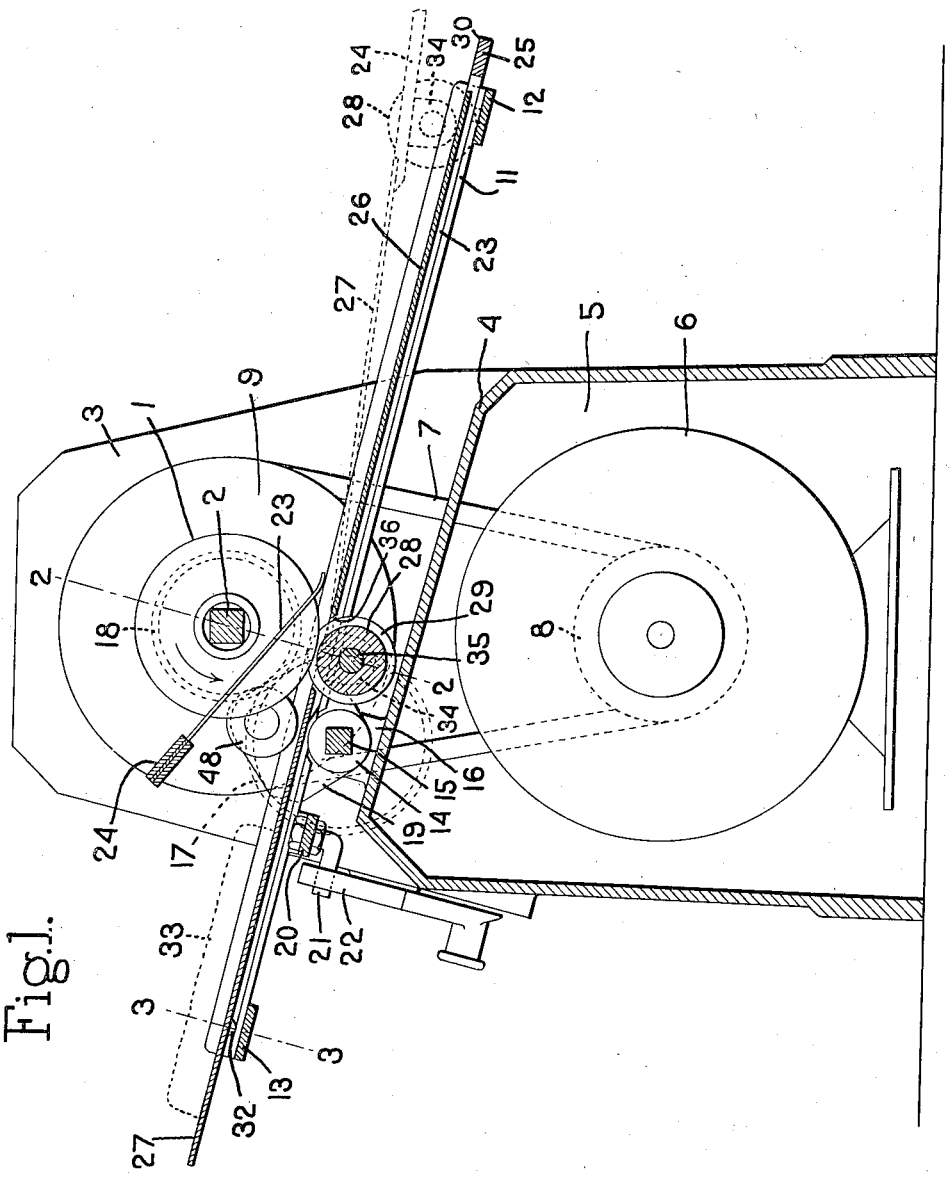

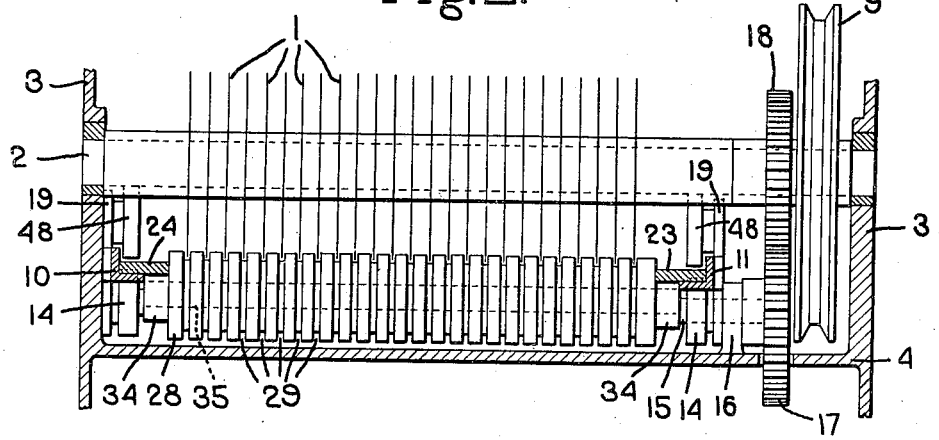
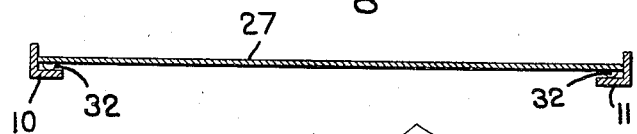
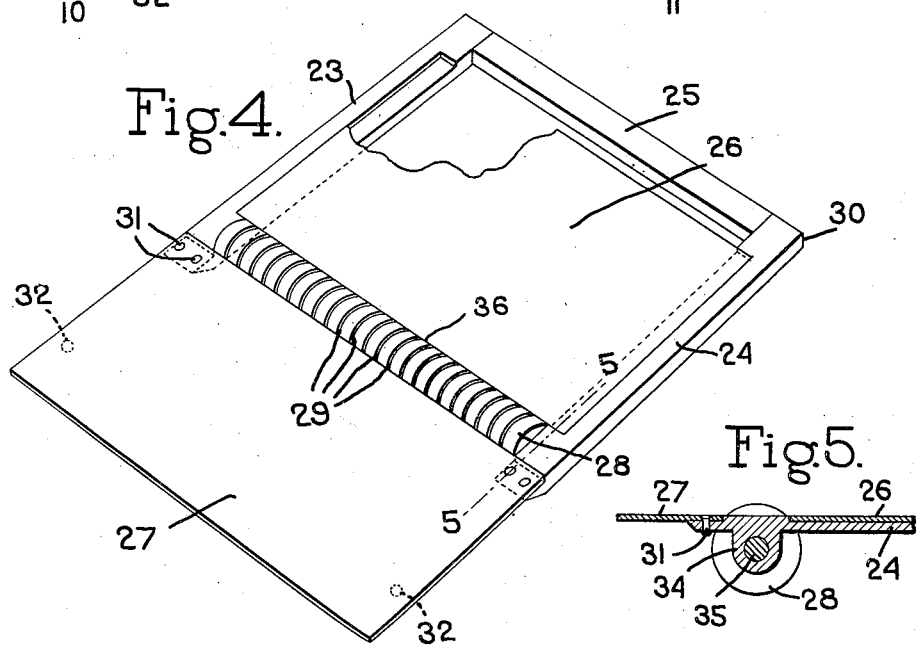

2,241,649

UNITED STATES PATENT OFFICE 2,241,649

MEAT-SLITTING MACHINE

Joseph P. Spang, Quincy, Mass., assignor to Cube Steak Machine Company, Inc., Boston, Mass., a corporation of Massachusetts Application November 29, 1939, Serial No. 306,635

7 Claims. (Cl. 17—26)

This invention relates to meat-slitting machines of the general type illustrated in my patent, No. 2,179,025, November 7, 1939, and has for its principal object to provide a novel attachment which, when applied to the machine, will convert the latter from a machine by which slits will be cut partially but not entirely through a slice of meat into a machine which will cut a slice of meat into strips, and by which the strips may be subsequently cut into small cubes.

The meat slitting machine illustrated in the above mentioned patent, No. 2,179,025, comprises a set of rotary slitting knives, and a plate-supporting member beneath the knives adapted to support a plate carrying the slice of meat to be slit, movement of the plate over the plate-supporting member carrying the slice beneath the knives by which it is slit, the plate-supporting member and plate being so arranged that as the slice of meat passes beneath the knives, the latter will cut slits nearly but not quite through the slice, thereby leaving a film of unslit meat on the bottom face of the slice.

It is sometimes desirable to cut a slice of meat into separate strips and subsequently to cut the strips transversely into small cubes.

The present invention provides a novel attachment which can be readily installed in a meat-slitting machine such as shown in my above-mentioned patent, No. 2,179,025, and by which the machine may be converted from one which will cut slits in the meat that extend nearly but not quite through the slice into a machine in which the knives will cut entirely through the slice, thereby cutting it into strips.

This attachment is simple in construction and can be readily and quickly installed in the machine or removed therefrom.

In order to give an understanding of the invention, I have illustrated in the drawings some selected embodiments of the invention which will be described, after which the novel features will be pointed out in the appended claims.

In the drawings:

Fig. 1 is a vertical sectional view through a machine embodying my invention and showing the attachment installed therein.

Fig. 2 is a section on the line 2—2, Fig. 1.

Fig. 3 is a section on the line 3—3, Fig. 1.

Fig. 4 is a perspective view of the attachment with a part broken out.

Fig. 5 is a section on the line 5—5, Fig. 4.

The meat-slitting machine illustrated herein is provided with a series of rotary slitting knives 1 that are mounted on a knife shaft 2, the latter being rotatively mounted in uprights or end pieces 3 with which the frame 4 of the machine is provided. The base portion of the frame 4 is made to provide a space 5 for an electric motor 6 by which the knives are rotated, and this motor is shown as operatively connected to the knives by means of a driving belt 7 which passes around a belt pulley 8 on the motor shaft and over a larger belt pulley 9 fast on the knife shaft 2. The machine is also provided with a plate-supporting member comprising two angle iron side rails 10 and 11 which are connected at their ends by tie members 12 and 13. These angle iron members 10 and 11 form a track or plate-supporting member adapted to receive a plate or panel carrying the slice of meat to be slit. In using the machine for cutting slits in the meat which extend nearly but not entirely through the slice, the plate or panel carrying the slice of meat will be placed on the plate-supporting member 10 and 11 at the upper lefthand end, Fig. 1, and the plate will then be moved downwardly or toward the right, Fig. 1, to carry the slice of meat beneath the rotating knives 1. The thickness of the plate is such that the cutting edges of the knives are spaced slightly from the upper surface of the plate as the latter passes beneath said knives, so that the knives will cut the slits part way but not entirely through the slice. The machine is also equipped with a pair of feed rolls 14 carried on a feed roll shaft 15 which is mounted in suitable bearings 16 carried by the frame, and said shaft is driven from the knife shaft 2 by means of two intermeshing gears 17 and 18, one of which is fast on the feed roll shaft 15 and the other of which is fast on the knife shaft 2. As the meat-supporting plate is moved along the supporting rails 10 and 11, it will be engaged by the positively driven feed rolls 14 which will serve to control the movement of the plate while it is passing beneath the knives. The surface speed of the feed rolls is considerably less than the peripheral speed of the knives, so that the knives will operate on the meat with a draw cut.

48 indicate presser rolls adapted to engage the edges of the meat-supporting plate and thereby hold said plate in firm frictional driving contact with the feed rolls 14.

The meat-supporting member 10 and 11 is pivotally mounted on the feed roll shaft 15, said members 10 and 11 each having a bearing plate 19 rigid therewith through which the feed shaft 15 extends and which provides the pivotal support for the plate-supporting member 10 and 11. Some suitable means are provided for holding the plate-supporting member 10 and 11 in its operative position, and as herein shown, the two side members 10 and 11 are connected by a cross member 20 which carries a laterally extending finger 21 adapted to engage a slot in a cam member 22 that is pivoted to the frame. This cam member serves as the means for adjusting the plate-supporting member about its pivot and also for holding it in any adjusted position. 23 indicates stripper fingers carried by a head 24 and which press against the upper face of the slice of meat as it passes beneath the knives, said stripper finger serving to hold the meat on the plate and prevent it from being lifted therefrom by the action of the rapidly rotating knives.

The machine as thus far described is similar in general construction to that shown in my above-mentioned Patent No. 2,179,025, and as stated above, the machine will operate to cut slits partially but not entirely through a slice of meat which is carried beneath the knives on a meat-supporting plate travelling on the side rails 10 and 11.

The present invention relates to a novel attachment adapted to be installed in the machine, as thus far described, and by which the machine may be converted into one in which the knives will cut entirely through the meat, thus cutting a slice of meat into separate strips. The attachment is shown at 30, in Fig. 4, and it comprises a receiving platform section on which the slice of meat to be cut into strips is deposited, a delivery platform section on which the cut meat is delivered from the knives, and a raised meat-supporting portion between said platform sections and situated beneath the knives and provided with knife-receiving grooves into which the knives dip, whereby when a slice of meat is fed from the receiving platform section onto the delivery platform section over the raised portion, said slice of meat will be cut by the knives into separate strips. This attachment is separable from the machine and can be readily placed therein or removed therefrom.

In the construction shown, the attachment 30 is formed with two side members 23, 24, which are connected by an end member 25 and to which the two platform sections are secured. One platform section, the delivery section, is shown at 26, and it rests on the two side members 23, 24. The other platform section, the receiving section, is shown at 27, and it is secured at one edge to the ends of the side members 23, 24 in some suitable way, as by means of rivets 31. The two platform sections are spaced from each other to provide a slot 36, and the raised, grooved meat-supporting portion is shown in the form of a roller 28 having peripheral grooves 29, said roller occupying the slot 36 and being so disposed that the upper surface of the roller 28 extends somewhat above the platform sections 26, 27. The peripheral grooves 29 of the roller 28 have the same spacing as the knives 1 on the knife shaft 2. This roller is mounted on a shaft 35 which is journaled in bearings 34 formed on the side members 23, 24.

In installing the attachment 30 in the machine, the free end of the platform section 27 is introduced into the machine beneath the knives and between the feed rolls 14 and presser rolls 48, as shown in dotted lines, Fig. 1, and then the attachment is moved forwardly or to the left, Fig. 1, until the side members 23, 24, rest on the side rails 10 and 11 with the grooved roll 28 located beneath the knives 1, and adjacent to the feed rolls 14, as shown in Figs. 1 and 2. The grooved roll 28 projects somewhat above the platform sections 26, 27, and when said attachment is in its operative position, the upper surface of the grooved roll 28 stands above the lower edges of the knives 1, and said knives dip into the grooves 29. When the attachment is fully installed, the platform section 27 will extend considerably to the left of the knives 1 in Fig. 1, thus making a receiving platform on which the slice of meat to be slit may be placed. This platform section 27 is shown as provided with protuberances 32 which rest on the side rails 10 and 11, and thus support the platform section 27 in its proper position.

In using the machine with the attachment installed, a slice of meat 33, shown in dotted lines, Fig. 1, is placed on the receiving platform section 27, and then moved downwardly over and across the roll 28. During the movement of the meat across and over the roll and from the receiving platform section 27 to the delivery platform section 26, the knives will cut entirely through the meat and thus cut the slice of meat into strips. These strips are deposited on the delivery platform section 26, and they may then be transferred to the receiving platform section 27 in a position extending transversely or at right angles to the direction of feed. The feeding of the strips of meat from the platform section 27 to the platform section 26 will result in these strips being cut into short lengths so that the meat which is delivered on the delivery platform 26 will be in the form of diced meat.

I claim:

1. A meat slitting machine comprising a set of rotary knives, means to rotate the knives, a supporting member beneath the knives over which a meat-supporting plate may be moved to carry a slice of meat to be slit past the knives, a platform element separable from the machine and presenting a receiving platform section, a delivery platform section and a raised meat-supporting portion between said platform sections and provided with knife-receiving grooves, said platform element being adapted to be removably installed in the machine on the supporting member with the knives dipping into said grooves, whereby, when said platform element is so installed, a slice of meat will be cut into separate strips when it is fed over the platform element past the knives.

2. A meat-slitting machine comprising a set of rotary knives, means to rotate the knives, a supporting member beneath the knives over which a meat-supporting plate may be moved to carry a slice of meat to be slit past the knives, and a platform element separable from the machine and presenting a receiving platform section, a delivery platform section, and a meat-supporting roller between said sections formed with peripheral knife-receiving grooves, said platform element being adapted to be removably installed in the machine on the supporting member with the grooved roller beneath the knives and with the knives dipping into said grooves, thereby converting the machine into one which will cut a slice of meat into separate strips.

3. A meat-slitting machine comprising a set of rotary knives, means to rotate the knives, a supporting member beneath the knives over which a meat-carrying plate can be moved to convey a slice of meat to be slit past the knives, and a platform element separable from the machine presenting a receiving platform section and a delivery platform section which are separated by a slot, and also presenting a meat-supporting roll rotatably mounted on the platform element and occupying said slot, said roll having peripheral knife-receiving grooves, said platform element being adapted to be removably installed in the machine on the supporting member with the grooved roller beneath the knives and with the knives dipping into said grooves, thereby converting the machine into one which will cut a slice of meat into separate strips.

4. A meat-slitting machine comprising a set of rotary knives, means to rotate the knives, a supporting member beneath the knives over which a meat-supporting plate may be moved to carry a slice of meat to be slit past the knives, and a platform element presenting a receiving platform section, and a meat-supporting roller adjacent the delivery edge of the receiving platform section, said roller being provided with peripheral knife-receiving grooves, the said platform element being adapted to be installed in the machine on the supporting member with the grooved roller beneath the knives and with the knives dipping into said grooves, thereby converting the machine into one which will cut a slice of meat into separate strips.

5. A meat-slitting machine comprising a set of rotary knives, means to rotate the knives, a supporting member beneath the knives over which a meat-supporting plate may be moved to carry a slice of meat to be slit past the knives, in combination with a slice-receiving member and a meat-supporting roller having circumferential knife-receiving grooves, said slice-receiving member and roller being adapted to be installed in the machine on the supporting member with the grooved roller beneath the knives and with the knives dipping into said grooves, thereby converting the machine into one which will cut a slice of meat into separate strips.

6. As an article of manufacture, a meat-supporting platform element adapted to be removably installed on the supporting member of a meat-slitting machine which is equipped with rotary knives in order to convert the machine from one adapted to cut slits part way only through a slice of meat to one adapted to cut a slice into separate strips, said platform element having a receiving platform section, a delivery platform section and a raised meat-supporting portion between said platform sections, which raised meat-supporting portion is provided with knife-receiving grooves situated to receive the knives of the machine when the platform element is installed therein.

7. As an article of manufacture, a meat-supporting platform element adapted to be removably installed on the supporting member of a meat-slitting machine which is equipped with rotary knives in order to convert the machine from one adapted to cut slits part way only through a slice of meat to one adapted to cut a slice into separate strips, said platform element having a receiving platform section and a delivery platform section which are separated by a slot, and also having a rotatably mounted meat-supporting roll occupying said slot, said roll having peripheral knife-receiving grooves situated to receive the knives of the machine when the platform element is installed therein.

JOSEPH P. SPANG.